May 30, 1961 W. L. MOHAN, JR 2,986,687
VARIABLE OUTPUT RECTIFIER SYSTEM FOR ELECTRIC MOTOR
Filed Nov. 6, 1958 4 Sheets-Sheet 1
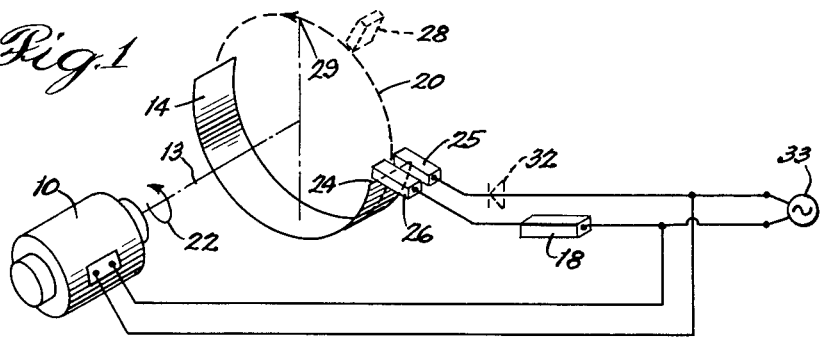
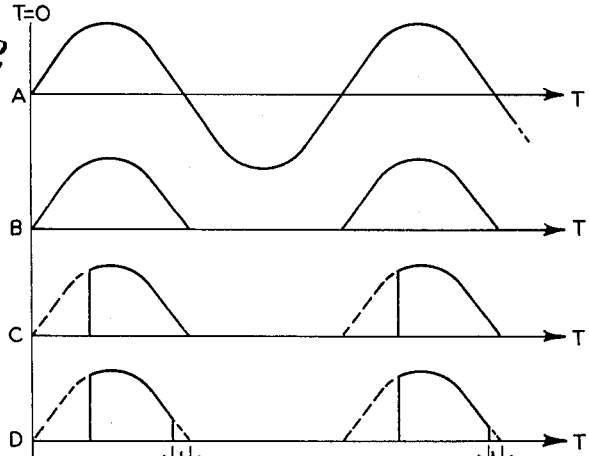
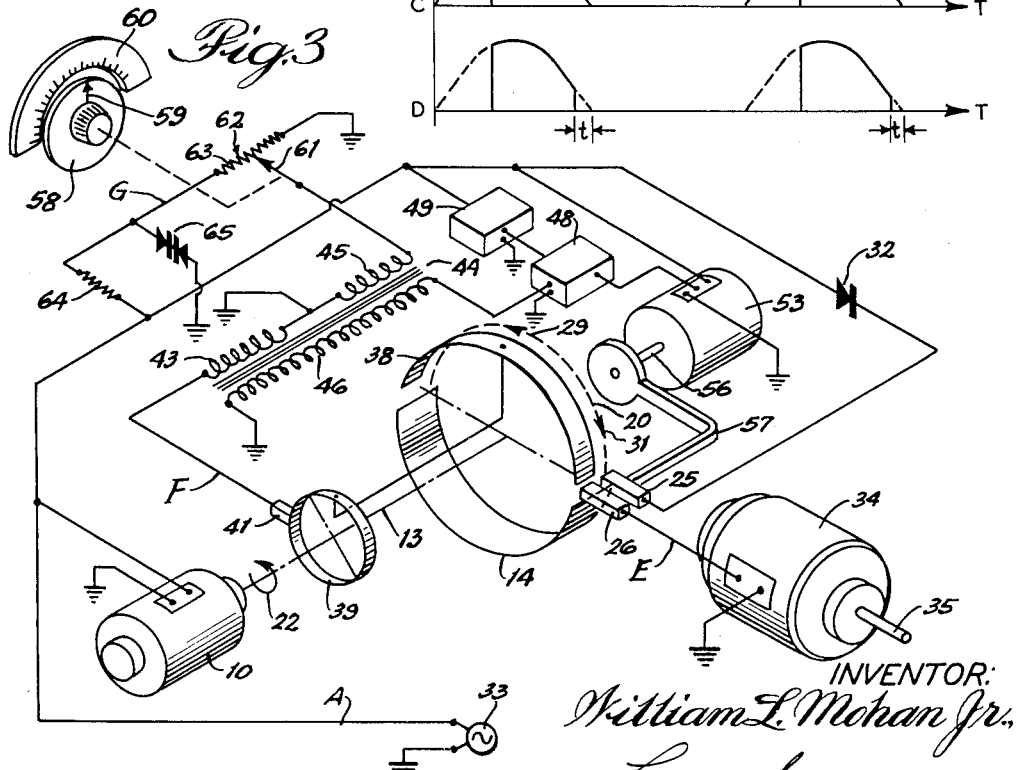
INVENTOR:
William L. Mohan Jr.,
BY
ATTORNEY.

May 30, 1961  W. L. MOHAN, JR  2,986,687
VARIABLE OUTPUT RECTIFIER SYSTEM FOR ELECTRIC MOTOR
Filed Nov. 6, 1958  4 Sheets-Sheet 2
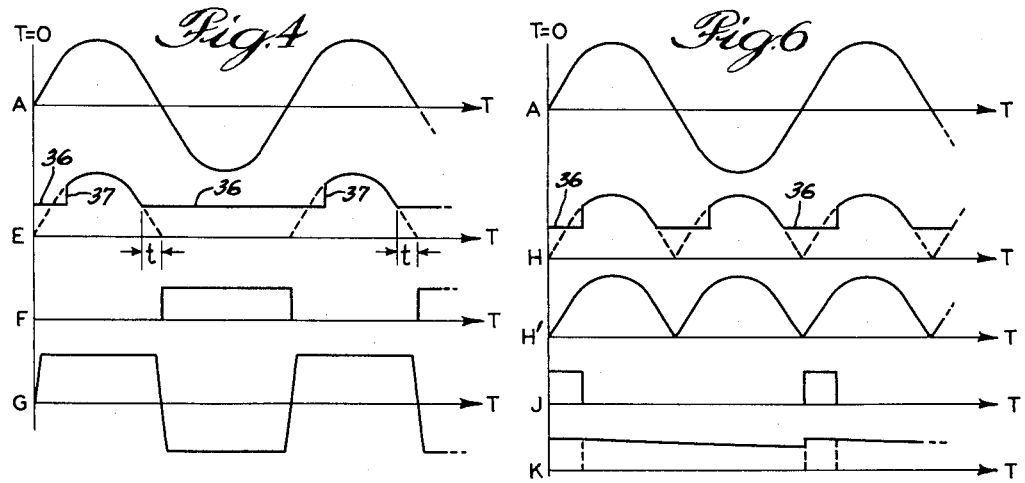
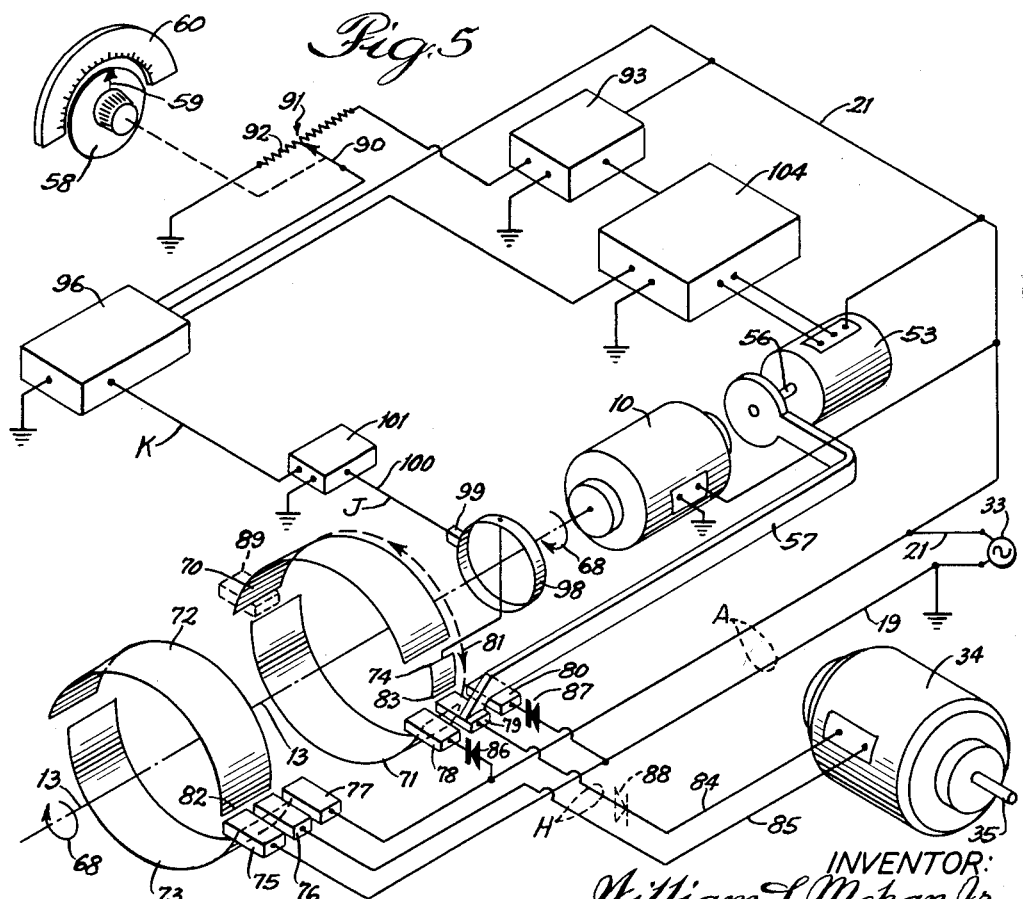
INVENTOR:
William L. Mohan Jr.,
BY Louis ........
ATTORNEY.

May 30, 1961  W. L. MOHAN, JR  2,986,687
VARIABLE OUTPUT RECTIFIER SYSTEM FOR ELECTRIC MOTOR
Filed Nov. 6, 1958  4 Sheets-Sheet 4
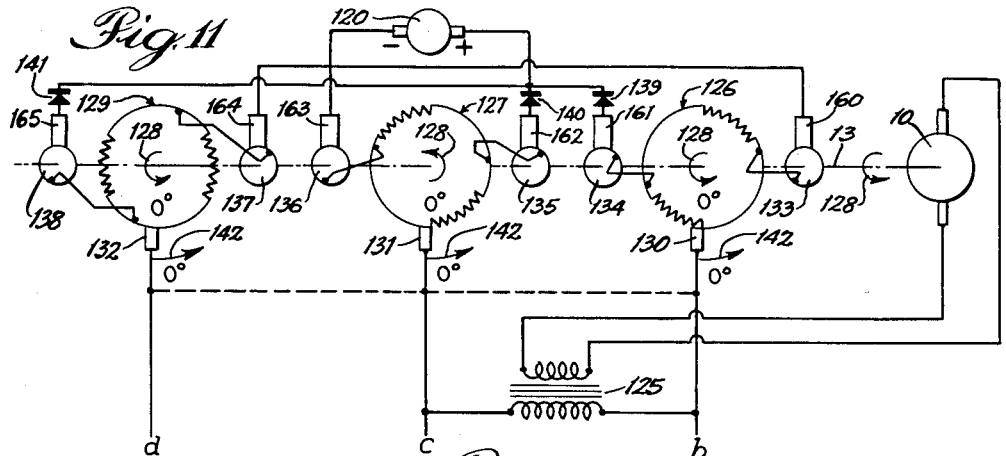
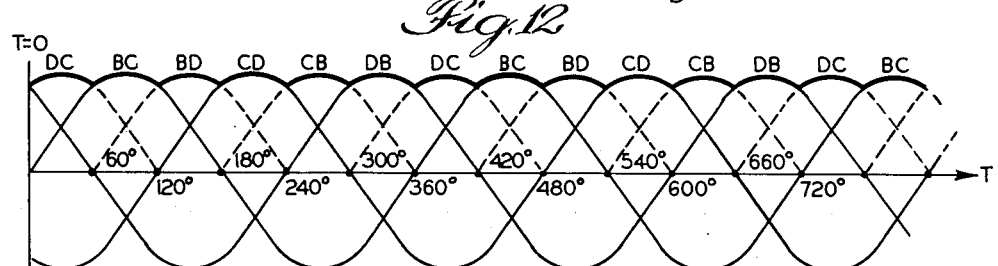
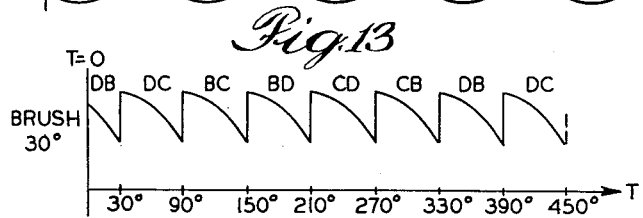
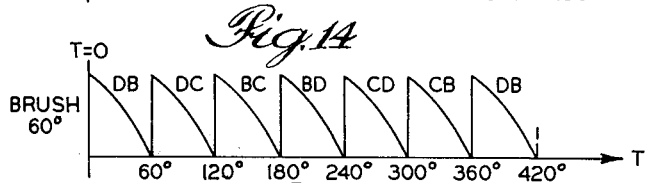
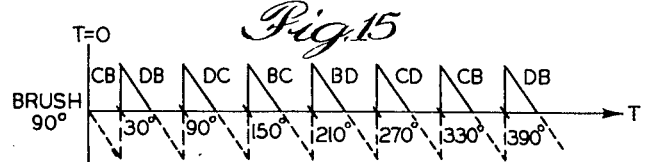
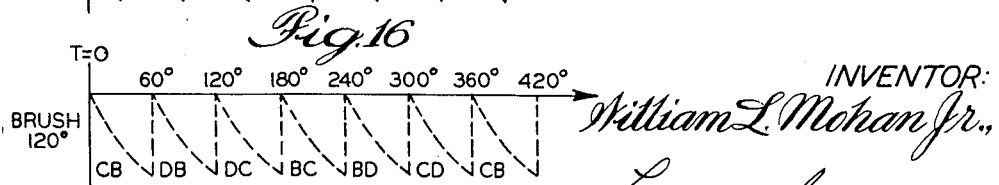
INVENTOR:
William L. Mohan Jr.,
BY Louis Bernat.
ATTORNEY.

United States Patent Office

2,986,687
Patented May 30, 1961

2,986,687

VARIABLE OUTPUT RECTIFIER SYSTEM FOR ELECTRIC MOTOR

William L. Mohan, Jr., Mount Prospect, Ill., assignor, by mesne assignments, to Chicago Aerial Industries, Inc., Melrose Park, Ill., a corporation of Delaware Filed Nov. 6, 1958, Ser. No. 772,233

22 Claims. (Cl. 318—331)

This application relates generally to apparatus for obtaining a D.C. energy output from an A.C. energy source, and more particularly to new and improved apparatus for converting A.C. energy to a selectively variable D.C. energy output.

Many devices and methods are known in the prior art for converting alternating current electrical energy to direct current electrical energy. Such prior art devices include, for example, motor-generator sets, vacuum tube and gas tube rectifiers, and solid state rectifiers such as those made from selenium, germanium, and the like.

Where the desired D.C. energy output need only have a relatively constant value, prior art structures have provided generally satisfactory results. However, whenever variations in D.C. output energy are required, the conversion devices known in the prior art become relatively expensive and complex. Further, many of these known devices have not proved completely satisfactory in terms of service life or reliability.

Accordingly, it is a general object of this invention to provide new and improved apparatus for converting A.C. electrical energy to D.C. electrical energy.

It is a more particular object of this invention to provide new and improved apparatus for converting A.C. voltage into a variable output D.C. voltage.

It is another object of this invention to provide new and improved rectifying apparatus as described above, which finds advantageous use in controlling the speed of a D.C. motor.

It is still another object of this invention to provide new and improved rectifying apparatus with a variable D.C. voltage output which is adapted for use with single phase and polyphase A.C. voltage sources, and which is adapted for half-wave and full-wave rectification.

It is a further object of this invention to provide new and improved rectifying apparatus with a variable D.C. voltage output which includes at least one rotating commutator segment and a plurality of brushes associated therewith, at least one of said brushes being selectively movable to provide a selective D.C. voltage output.

It is still a further object of this invention to provide new and improved rectifying apparatus, as described above, including a rotating commutator segment and a selectively movable brush, which further includes servo feedback means for automatically controlling the selectively variable D.C. voltage output at a desired level.

It is a still further object of this invention to provide new and improved rectifying apparatus having a variable D.C. output which is characterized by its relative simplicity and economy of construction, and its flexibility and reliability of operation.

These and other objects are realized in accordance with a specific illustrative embodiment of this invention in which the variable output rectifier system comprises at least one commutator adapted to be rotated at synchronous speed, as by means of a synchronous motor energized from an A.C. source. A plurality of current conducting brushes are operatively associated with the rotating commutator segment and advantageously one of the brushes is connected to one terminal of the A.C. source and another one of the brushes is connected through the D.C. load to another terminal of the A.C. source. Thus, when the rotating commutator segment is in electrical contact with the brushes, a circuit is completed from the A.C. source to the D.C. load.

In accordance with a feature of one embodiment of this invention, the rotating commutator segment extends through an arc of approximately 180° so that when the brushes are in parallel alignment, the electrical circuit to the D.C. load is completed during approximately each half cycle of the A.C. voltage, thereby providing a rectified D.C. output to the load.

It is a salient feature of this invention that one of the brushes is made movable with respect to the rotating commutator segment and the other brush is fixed in position with respect to the rotating commutator segment. Those skilled in the art will readily appreciate that the movable brush may be selectively positioned with respect to the fixed brush such that the rectified electrical energy to the load may be selectively varied as desired from a maximum power position, where the brushes are in parallel alignment, to a minimum power position where the brushes are spaced 180° from each other. The provision of means for selectively varying the position of the movable brush enables the output of the rectifier to be varied in a continuous and stepless fashion from the maximum to the minimum power positions.

In accordance with a feature of the further embodiments of the invention, the variable D.C. output in the rectifier system may be controlled at a desired level by means of a feed-back signal which is compared with a command signal. The comparison or error signal is utilized to operate a servo motor for positioning the selectively movable brush in response to any variation in the level of the D.C. output. Advantageously, when the novel rectifier system is utilized to control the speed of the D.C. motor load, the feedback signal may be obtained from the counter-E.M.F. induced in the D.C. motor load, or alternatively, the feedback signal may be obtained from a generator-tachometer set.

Still further features of this invention include the adaptability of the variable output rectifier system to single phase and polyphase A.C. voltage sources, and its ability to provide both half-wave and full-wave rectification.

The above and other features of novelty which characterize the invention are pointed out with particularity in the claims annexed to and forming a part of this specification. For a better understanding of this invention, however, its advantages and specific objects attained by its use, reference is had to the accompanying drawing and descriptive matter in which is shown several illustrative embodiments of the invention.

In the drawing:

Figure 1 is a schematic and pictorial representation of an illustrative variable output rectifier system embodying the basic principles of the invention;

Figure 2 is a chart showing wave forms illustrating the operation of the circuit of Figure 1;

Figure 3 is a schematic and pictorial representation of an illustrative embodiment of the invention utilizing servo feedback means for controlling the variable D.C. output of the rectifier system;

Figure 4 is a chart showing wave forms illustrating the operation of the circuit of Figure 3;

Figure 5 is an illustrative embodiment of the invention adapted to provide full wave rectification of a singlephase A.C. source;

Figure 6 is a chart showing wave forms illustrating the operation of the circuit of Figure 5;

Figure 11 is a schematic diagram of an illustrative embodiment of the invention adapted for full wave rectification of a three phase A.C. voltage source; and Figures 12, 13, 14, 15 and 16 are charts showing wave forms illustrating the operation of the circuit of Figure 11.

Figure 7:
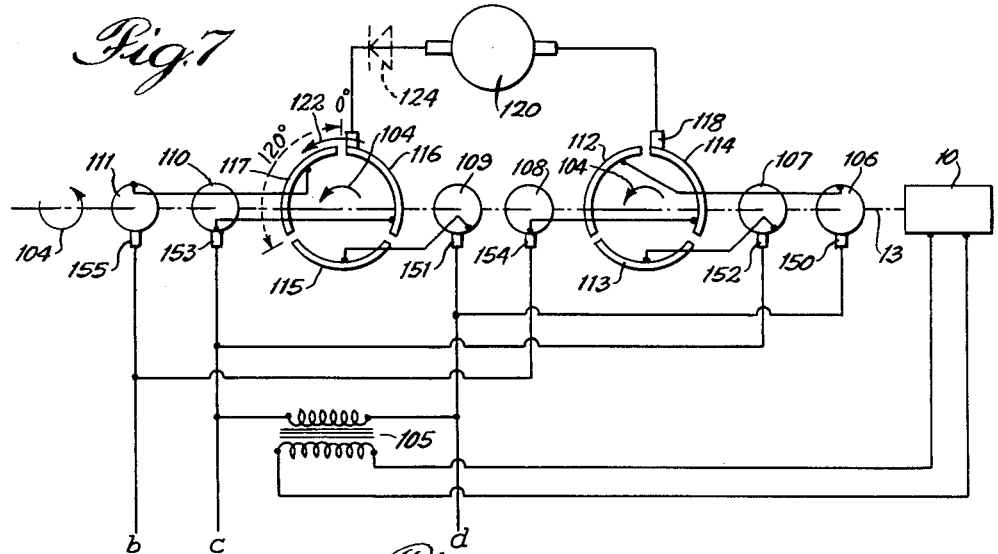
Figure 7 is a schematic diagram of an illustrative embodiment of the invention adapted for half wave rectification of a three phase A.C. source.

Referring now to the drawing, Figure 1 illustrates pictorially and schematically the principles of this invention in their simplest aspect as applied to the control of a D.C. load. A single phase A.C. source is connected to the device at the terminals generally indicated as 33. The wave form of the input is graphically illustrated at "A" in Figure 2.

A synchronous motor 10 is connected to terminals 33 resulting in the synchronous rotation of its output shaft 13. Motor 10 advantageously is of the two-pole polarzied, hysteresis type, although others may be used. The characteristic of this type of motor that makes it preferred is its ability to lock in phase at synchronous speed at only one position. Secured to shaft 13 and rotating therewith in the direction of arrow 22 is a commutator segment 14 whose angular extent is substantially 180 degrees.

Two brushes, 25 and 26, are operatively associated with segment 14 and connected to a D.C. load 18 and A.C. input terminals 33 in the manner illustrated. The two brushes are substantially identical in size and material. However, in accordance with an important feature of this invention, one brush is fixed in position and the other is movable. In Figure 1, brush 26 is fixed and brush 25 is movable through an arc 20 around shaft 13. Brush movement is limited between the two points corresponding to delivery of maximum and minimum power to the load as explained below.

The synchronously rotating commutator segment 14 is adjusted relative to fixed brush 26 to achieve proper phasing with respect to the A.C. supply. Proper phasing is achieved by having the leading edge 24 of segment 14 contact fixed brush 26 at an instant in time corresponding to some desired coordinates on the wave diagram of Figure 2A. The preferred coordinates are those for $t=0$. Then, if movable brush 25 is positioned so that segment 14 contacts it and fixed brush 26 simultaneously, maximum voltage and power are delivered to load 18. The only limitation on the amount of power delivered is that imposed by the maximum allowable current density on the brushes. The output waveform corresponding to this maximum voltage and power condition is illustrated at B in Figure 2.

Those skilled in the art now will understand that if movable brush 25 is advanced in the direction of arrow 29, the average voltage and power to the load is reduced. This provision is one of the unique features of the invention. If movable brush 25 is relocated to the position indicated by dotted outline 28, commutator segment 14 does not connect load 18 to the line until some time after $t=0$ in Figure 2, and the D.C. output pulses will have a wave shape similar to C in Figure 2.

By inspection, it is apparent that the average D.C. voltage and the power available in wave form "C" is less than that of "B." Further, any movement of brush 25 in the direction of arrow 29 will result in a decrease of the output voltage and power available until the output becomes substantially zero. Zero output is realized when brush 25 is positioned so that there is no contact with segment 14 during the interval when there is contact with brush 26, and this is achieved by moving brush 25 through 180 degrees from the position of maximum voltage and power.

The method and the device described above have been found very satisfactory for passive loads. Where the load 18 is inductive, e.g. a motor, advantageously a diode may be added to the circuit. This diode is indicated schematically in dotted outline at 32. The diode functions to prevent shorting of the line during any interval "t" where the induced E.M.F. is greater than the applied. This is graphically illustrated at "D" in Figure 2.

While the device of Figure 1 may be used to manually control the speed of a D.C. motor, the inventive principles embodied therein may be utilized for servo control of motor speed. Figure 3 illustrates pictorially and schematically such a device providing both half wave rectification and a continuously variable voltage output from a single phase A.C. input.

Figure 4 is a graphical diagram of the voltages which occur at various positions within the circuitry of Figure 3. The letters A, E, etc., indicate the wave forms of the voltages which occur between the correspondingly lettered positions and ground within the circuitry of Figure 3.

The circuit of Figure 3 includes all of the essential details of the Figure 1 circuit and differs therefrom primarily by the substitution of motor 34 for load 18 and by the addition of the components required for a speed control servo system. The motor 34 may be connected to any desired mechanical load within its capacity by means of output shaft 35.

In accordance with the invention, servo control of the speed of motor 34 is attained by controlling the position of movable brush 25 in response to command and feed back signals. Advantageously, the speed command signal may be established by setting of rotatable dial 58 with reference to a fixed index 60. Dial 58 carries thereon an arrow 59 or other suitable indicia to facilitate this setting. Dial 58, by means of a mechanical coupling, positions wiper 61 of potentiometer 62 with respect to resistance winding 63.

One terminal of winding 63 is connected to the A.C. supply line through a series resistor 64. The other terminal is connected to ground. Two diodes 65, which advantageously may be of the "Zener" type, are connected in parallel with winding 63. As is well known to those skilled in the electronic arts, the diodes 65 and resistor 64 combine to form an approximate square wave generator. The approximately square wave present at the terminal of winding 63 is graphically illustrated at G in Figure 4. Potentiometer 62 modifies the amplitude of the impressed square wave as determined by the position of dial 58 and wiper 61. The resulting A.C. command signal is impressed on winding 45 of transformer 44.

Transformer 44 compares the A.C. command signal with a second A.C. signal representative of the speed of motor 34 to obtain a speed error signal. As illustrated, the A.C. feedback signal is obtained from the counter-E.M.F. of motor 34, although other means such as a D.C. generator-tachometer might equally well be employed. As is well known to those versed in the electrical arts, the magnitude of the motor counter-E.M.F. is directly proportional to motor speed.

A typical voltage waveform occurring between brush 26 and ground with the motor running at constant speed and brush 25 positioned for something less than full power is illustrated graphically at "E" in Figure 4. The constant D.C. components 36 are the counter-E.M.F. generated by motor 34. The vertical lines 37 coincide with contact between brush 25 and commutator segment 14 and the partial sinusoid results from the waveform "A" impressed. Diode 32 functions during interval "t" as described above.

To obtain the motor counter-E.M.F. for use as a servo feedback, an additional commutator segment 38 and a slip ring 39 to which the segment is electrically connected advantageously are secured to and rotate with the shaft 13 of synchronous motor 10. Segment 38 is so constructed and positioned that it makes contact with fixed brush 26 during the interval when the brush is not in contact with segment 14. Brush 25 does not contact segment 38 at any time. Brush 41 rides the surface of slip ring 39 and is connected to winding 43 of transformer 44. A typical voltage waveform occurring between brush 41 and ground with motor 34 operating at some fixed speed is shown at "F" in Figure 4.

As described above, transformer 44 compares the command and feedback signals to obtain an error signal. For the command and feedback signals used, the comparison may conveniently be by subtraction. The error signal appearing on winding 46 of transformer 44 is transmitted to a conventional A.C. amplifier 48, whose power supply is schematically indicated at 49.

The amplified error signal is passed to the control winding of a two phase A.C. brush positioning motor 53. Motor 53 has its fixed winding connected to the A.F. source. The output shaft 56 is connected to movable brush 25 by the positioning means schematically indicated as 57. Thus, for the condition where motor 34 is operating overspeed, the error signal will cause motor 53 to move brush 25 in the direction of arrow 29, and for the underspeed case, in the direction of arrow 31.

To facilitate the foregoing description and for clarity in the drawing, many additional devices and circuits that might be employed have been omitted. For example, it may be desirable to insert a device in the armature circuit of motor 34 to limit current to some safe value. Further, unless motor 34 contains a series or permanent magnet field, either an additional commutator segment and brushes, or electronic devices would be provided for field excitation. Also, either mechanical limit stops and a clutch or limit stop switches with their circuitry would preferably be supplied to limit movement of brush 25.

The devices described above have been illustrated as adapted to single phase, half wave rectification. Those skilled in the art will readily appreciate that the principles of this invention may with equally advantageous results, be adapted to polyphase and full wave rectification while retaining the feature of a stepless or continuous variable voltage output. Figure 5 illustrates pictorially and schematically the principles of this invention as embodied in a circuit for full wave rectification of a single phase source.

In Figure 5, A.C. power is supplied to the terminals 33 of the device and has the substantially sine wave form shown in Figure 6A. For the example illustrated, one leg of the source is grounded as is common in power transmission practice, although this does not form a limitation as will be apparent from the following.

As with the embodiments described above, a synchronous motor 10 is connected to terminals 33 to cause rotation of motor output shaft 13 at synchronous speed in the direction of arrows 68. As for the previously discussed embodiments, motor 10 advantageously may be of the polarized hysteresis type.

Rigidly secured to shaft 13 and rotating with it are slip ring 98 and five commutator segments 70, 71, 72, 73 and 74. In this illustrative embodiment of the invention the angular extent of each of segments 71, 72 and 73 is shown as substantially 180 degrees and the angular extent of segments 70 and 74 together is shown as substantially 180 degrees.

Operatively associated with segment 72 are two brushes 75 and 76 and with segment 73, brushes 76 and 77. In accordance with one specific embodiment of the invention the three brushes are of similar size and are positioned in a fixed, parallel, in-line and spaced-apart relationship to each other. The clearance between segments 72 and 73 is sufficient to prevent brush 76 from shorting the two together.

Operatively associated with segment 70 are two brushes 78 and 79; with segment 71, brushes 79 and 80 and with segment 74, brush 79. As described above, in this specific embodiment all three brushes are of substantially the same size and are positioned in a parallel, in-line and spaced-apart relationship to each other. Brushes 78 and 80 are fixed in position whereas brush 79 is movable through an arc of substantially 180° around shaft 13. As with segments 72 and 73, the spaces between segments 70, 71 and 74 are each sufficiently wide to prevent brush 79 from shorting any two together.

The five commutator segments are each adjusted with respect to their associated brushes to achieve proper phasing with respect to the A.C. supply. Proper phasing is achieved by having the leading edges 82 and 83 of segments 72 and 74 respectively, make contact with their associated brushes at some desired coordinates on the wave diagram of Figure 6A. Advantageously, movable brush 79 is parallel and in line with fixed brushes 78 and 80 during the phasing. If, at the moment of contact, the coordinates are those for $t=0$, maximum full wave rectified voltage and power are delivered to the D.C. load.

For the half cycle when lead 21 is positive with respect to lead 19, the path to motor 34 is through lead 21, diode 86, brush 78, segment 70, brush 79, and lead 84 to the D.C. load, here shown as motor 34. The return path is by lead 85, brush 76, segment 72, and brush 75 to lead 19. During this period, brushes 77 and 80 do not contact a commutator segment. Diode 86 prevents a short circuit from occurring during the period that the motor counter-E.M.F. is greater than the impressed voltage.

For the half cycle when lead 19 is positive with respect to lead 21, the path to motor 34 is through lead 19, diode 87, brush 80, segment 71, brush 79, and lead 84. The return path is by lead 85, brush 76, segment 73, brush 77, and lead 21. Diode 87 serves the identical purpose as diode 86, but for this half cycle only. When the counter-E.M.F. of motor 34 is not used to provide the speed feed back, both diodes 86 and 87 may be replaced with the diode shown schematically in dotted outline at 88. Where the load is passive, the diodes may be dispensed with entirely.

The voltage waveform across leads 84 and 85 for a passive load is illustrated at H' in Figure 6. For an inductive load such as motor 34, the waveform is illustrated at H. As in the case of Figure 4, the constant D.C. component 36 is the counter-E.M.F. generated by motor 34.

As in the examples previously described, the average value of the D.C. voltage supplied to the load may be decreased to zero by movement of brush 79 along path 81 to position 89 where it is illustrated in dotted outline. By positioning the brush at intermediate points, the D.C. voltage output and thereby the speed of motor 34 may be varied. For servo control of motor speed with a single phase A.C. input and full wave D.C. output, it has been found that the illustrative embodiment shown schematically in Figure 5 may advantageously be employed.

Rotatable knob 58 carrying thereon an arrow 59 or other suitable reference is positioned with respect to a fixed index 60 to insert the speed command. Knob 58 is mechanically linked to and serves to position the movable arm 90 of the potentiometer generally indicated at 91. The resistance winding 92 of the potentiometer is connected between ground and a D.C. source supplied by power supply 93. The D.C. command signal thus derived is proportional to the speed desired and is passed to modulator 96 where it is compared with a D.C. voltage representative of the speed of motor 34.

As illustrated, the D.C. feedback voltage used is the counter-E.M.F. of motor 34. This voltage is passed by segment 74 to slip ring 98. From there, by means of brush 99 and lead 100, this pulsating D.C. signal is transmitted to filter 101. Filter 101 smoothes the pulsating D.C. shown at J in Figure 6 to that shown at K. This signal is then passed to modulator 96.

In the modulator, which may be any one of the many types known in the art suitable for this purpose, the command signal from potentiometer 91 is combined with the feedback signal. The resultant error is then modulated at line frequency in a well understood manner. This then becomes an A.C. signal which varies in both phase and magnitude depending on the direction and amount of error. This error signal is passed to a conventional A.C. servo amplifier 104 which in turn controls the two-phase servo motor 53. Motor 53 has its output shaft 56 secured to a brush positioning means 57 with the result that the movable brush 79 secured to positioning means 57 is repositioned in accord with the error signal. In turn, the voltage and power to the D.C. load are accordingly varied.

While the embodiment of Figure 5 illustrates the use of motor counter-E.M.F. as a feedback reference for the speed control servo system, it is contemplated that a tachometer generator may also be used for this purpose in accordance with the principles of the invention. The use of a tachometer-generator permits omission of commutator segment 74 and slip ring 98 with its brush 99, and also allows an increase in the amplitude of the D.C. voltage and power obtained. In addition, use of a tachometer-generator is more readily adaptable to a full floating A.C. supply line.

In the embodiment of Figure 5, the maximum average D.C. voltage available is approximately .637 of the single phase supply's maximum and hence the maximum power is approximately .405 $E_{max} I_{max}$. Where it is desirable to deliver more power to the controlled D.C. load than is available with single phase full wave rectification, it is a feature of the invention that it may be extended to polyphase inputs. An illustrative system for half wave rectification of a three phase, three wire source is shown schematically in Figure 7 wherein the principle of moving the control brush to vary the average voltage and power to the D.C. load is used. With this system, for a given maximum allowable line current, the power available to the D.C. load is approximately .682 $E_{max} I_{max}$.

Figure 8:
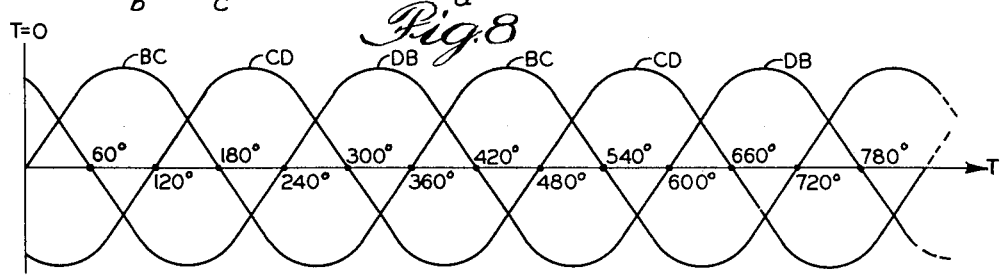
Figures 8, 9 and 10 are charts showing wave forms illustrating the operation of the circuit of Figure 7.

The three leads supplying the A.C. power have been designated $b$, $c$, and $d$. Figure 8 illustrates the wave form of the input in graphic form wherein the wave labeled $bc$ represents the voltage waveform of phase $b$ with respect to phase $c$, and similarly for waves $cd$ and $db$.

The synchronous drive motor 10 for the commutator segments is connected through transformer 105 to any two of the inputs, and in Figure 7, this is illustratively shown to be leads $c$ and $d$. This causes the motor output shaft 13 to rotate at synchronous speed in the direction of arrows 104. Rigidly secured to shaft 13, and rotating with it, are six slip rings 106, 107, 108, 109, 110, and 111 and the six commutator segments with which they are respectively associated, 112, 113, 114, 115, 116, and 117.

A fixed commutator brush 118 is connected to one side of a D.C. load, illustrated in Figure 7 as a motor 120. Brush 118 is operatively associated with commutator segments 112, 113, and 114. A commutator brush 121, movable from the position shown through an arc of substantially 120 degrees in the direction of arrow 122, is operatively associated with segments 115, 116, and 117. Brush 121 is connected to the opposite side of the D.C. load. Where the load is inductive as with a motor, the diode 124 illustrated in dotted outline should be used for the reasons described above. The various slip rings are connected to the three-phase source as shown, slip rings 106 and 109 being connected through brushes 150 and 151, respectively, to power lead $d$, slip rings 107 and 110 being connected through brushes 152 and 153 respectively, to power lead $c$, and slip rings 108 and 111 being connected through brushes 154 and 155, respectively, to power lead $b$.

Figure 9:
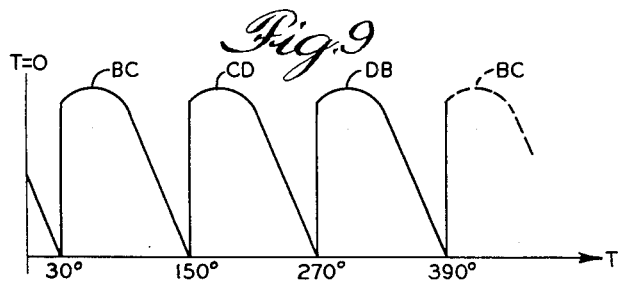
Figure 10:
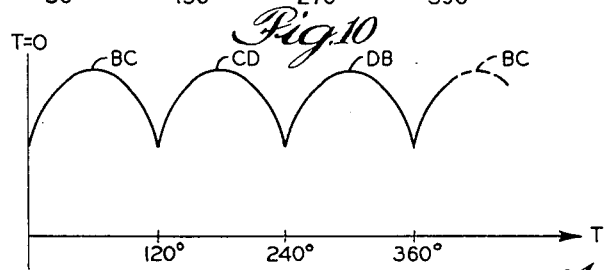

Various output waveforms can be achieved depending upon the phasing of the commutator segments with respect to the point $t=0$ in Figure 8. Two output waveforms that advantageously may be obtained are shown in Figures 9 and 10. In accordance with the invention, the waveform of Figure 9 is achieved by arranging the leading edges of segments 114 and 116 with respect to their cooperating brushes 118 and 121 so that contact is made at the coordinates for electrical 30 degrees in the wave diagram of Figure 8. Similarly, the waveform of Figure 10 is achieved by making contact at the coordinates for electrical 0 degrees in the wave diagram of Figure 8.

The waveform of Figure 10 results in a higher voltage and a greater availability of power than the waveform of Figure 9. However, under certain conditions, the regulation of the voltage and power may be more easily achieved with the waveform of Figure 9. The waveforms of both Figures 9 and 10 are achieved with the movable brush 121 at the 0 degree or maximum voltage position. Moving this brush in the direction of arrow 122 has an effect similar to that described above for the single phase versions of the invention.

To simplify the explanation of the novel circuit shown in Figure 7, the servo system to control brush position has not been illustrated. However, those skilled in the art will readily appreciate that the servo system feedback disclosed in Figure 5 may advantageously be used with the circuit of Figure 7. As also noted previously, the servo system feedback may be a motor driven D.C. tachometer-generator in place of utilizing the counter-E.M.F. of the driven motor.

The maximum theoretical efficiency of a three phase half wave rectifier is 79%. To attain higher efficiencies with attendant increased power handling capacity, full wave rectification may be used. An allustrative system for full wave rectification of a three phase, three wire source embodying the principles of this invention, is shown schematically in Figure 11, wherein the three leads supplying the A.C. power have been designated $b$, $c$, and $d$. The wave forms of the input are graphically illustrated in Figure 8. A transformer 125, supplying power to the polarized hysteresis type synchronous motor 10, is connected between any two of the phases, here illustrated as $b$ and $c$. In this manner, the output shaft 13$d$ of motor 10 is caused to rotate at synchronous speed in the direction of arrows 128.

Associated with each of these input leads $b$, $c$, and $d$, are three movable brushes respectively designated 130, 131 and 132. Advantageously, the three brushes are mechanically linked together in any suitable manner (as indicated by the broken line) so that they may be simultaneously rotated around shaft 13 through arcs of equal included angles. In accordance with an aspect of this embodiment of the invention, brush movement is limited between two points corresponding to maximum and minimum power to the load as explained more fully hereinbelow.

Advantageously, as illustrated in Figure 11, a segmented commutator ring is operatively associated with each of three movable brushes 130, 131, and 132. The peripheral portions of the three commutator rings 126, 127, and 129 are each comprised of two conducting and two insulating segments. The angular extent of each of the conducting segments is substantially 120 degrees and the angular extent of each of the insulator portions is 60 degrees. Six slip rings 133, 134, 135, 136, 137, and 138 are provided, each of which is electrically connected to an appropriate conducting commutator segment as shown. The slip rings and commutator segments are all rigidly connected to shaft 13 and rotate therewith.

Each of the six clip rings has a brush with which it is operatively associated. Thus brush 160 is in electrical contact with slip ring 133, brush 161 with slip ring 134, brush 162 with slip ring 135, brush 163 with slip ring 136, brush 164 with slip ring 137, and brush 165 with slip ring 138. Through these brushes, the several rings may be connected to a D.C. load in the preferred manner illustrated. To eliminate the shorting between phases of the A.C. input that would occur under some operating conditions, three diodes, 139, 140, and 141 advantageously may be employed. The diodes also serve to isolate the D.C. load from the A.C. input where the load is inductive. As illustrated, the diodes are placed in each of the positive slip ring leads. However, the diodes may equally well be positioned in the negative leads if their polarities are properly orientated.

The three synchronously rotating commutator rings 126, 127, and 129 are each adjusted with respect to their associated movable brush to achieve proper phasing with respect to the A.C. supply. Proper phasing is achieved by having a line on each ring coincide with a reference surface on the associated brush at some desired coordinate on the wave diagram of Figure 8. For the embodiment of Figure 11, the lines on the commutator rings and the reference surfaces of their brushes are each designated 0 degrees. If, at the moment of coincidence, the coordinates are those for $t=0$, maximum voltage and power are delivered to the D.C. load. This is graphically illustrated by the heavy line in the wave diagram of Figure 12.

Now, if the movable brushes are advanced in the direction of arrows 142 from the position shown in Figure 11, a reduction is made in the average voltage and power to the load. This is illustrated in Figures 13, 14, 15, and 16 for brush advances of 30, 60, 90, and 120 degrees respectively. In Figures 15 and 16, the dotted waveforms represent the portion of the output blocked by diodes 139, 140, and 141. As can readily be seen, the output to the load may be reduced to substantially zero in a continuous and stepless manner by a 120 degrees movement of the three movable brushes 130, 131, and 132.

To simplify the circuit of Figure 11 and to facilitate the explanation of its operation, the servo system to control the position of the three movable brushes has not been illustrated. However, those skilled in the art will readily appreciate that the servo system feedback described in connection with Figure 5 may be utilized in the circuit of Figure 11. Further, as with the half-wave, three phase system of this invention, a motor driven tachometer may advantageously be used in lieu of the motor counter-E.M.F. to originate the servo system feedback signal.

Although the examples described above have primarily been applications of this invention applied to a motor speed control system, it will be obvious to those skilled in the art that this invention may equally well be applied to other D.C. applications; for example, resistance heating, electro-plating, arc and seam welding, to name a few. Further, it will be understood that while two and three phase systems utilizing the principles of this invention have been described to illustrate the many advantages obtainable from its use, manifestly the invention is equally adaptable to other polyphase systems.

Accordingly, modifications may be made in the construction and arrangement of the above-described Variable Output Rectifier System without departing from the real spirit of the invention, and that it is intended to cover by the appended claims, any modified systems or use of equivalents which may be included within their scope.

What is claimed as the invention is:

1. The improvement of apparatus for converting A.C. energy into D.C. energy having a selectively variable output comprising a source of A.C. energy, a commutator segment, synchronous motor driving means coupled to said commutator segment and adapted to be energized by said A.C. source for rotating said commutator segment at synchronous speed, said motor driving means being locked in phase at synchronous speed at only a single, cyclic position thereof, a D.C. load, a plurality of brushes operatively associated with said commutator segment, means connecting said brushes and said D.C. load in circuit with said A.C. source for applying rectified A.C. energy to said D.C. load by the cyclic contact of said commutator segment with said brushes, and means for selectively varying the rectified output to said D.C. load by selectively varying the operating position of at least one of said brushes relative to said commutator segment.

2. The improvement of apparatus for converting A.C. voltage into D.C. voltage having a selectively variable output comprising a source of A.C. voltage, at least one arcuate commutator segment, synchronous motor driving means coupled to said commutator segment and adapted to be energized by said A.C. source for rotating said commutator segment at synchronous speed, said motor driving means being locked in phase at synchronous speed at only a single, cyclic position thereof, an inductive load, a plurality of brushes operatively associated with said commutator segment, means connecting said brushes and said load in circuit with said A.C. source for applying rectified A.C. voltage to said load by the cyclic contact of said commutator segment with said brushes, means for selectively varying the rectified output to said load by selectively varying the operating position of at least one of said brushes relative to said commutator segment, and rectifier means connected in series with said inductive load for preventing said brushes from being shorted when the induced voltage in said inductive load exceeds the D.C. voltage applied thereto.

3. The improvement of apparatus for converting A.C. energy into D.C. energy having a selectively variable output comprising a source of A.C. energy, a commutator segment, driving means coupled to said commutator segment and adapted to be energized by said A.C. source for periodically driving said commutator segment at synchronous speed, said driving means comprising a synchronous motor adapted to be locked in phase at synchronous speed at only one cyclic position thereof, a D.C. load, a plurality of brushes operatively associated with said commutator segment, means connecting said brushes and said D.C. load in circuit with said A.C. source for applying rectified A.C. energy to said D.C. load by the periodic contact of said commutator segment with said brushes, and means for selectively varying the rectified output to said D.C. load by selectively varying the operating position of at least one of said brushes relative to said commutator segment.

4. The improvement of apparatus for converting A.C. energy into D.C. energy having a selectively variable output comprising a source of A.C. energy, a commutator segment having an arcuate extent no greater than 180°, synchronous motor driving means coupled to said commutator segment and adapted to be energized by said A.C. source for rotating said commutator segment at synchronous speed, said motor driving means being locked in phase at synchronous speed at only a single, cyclic position thereof, a D.C. load, a plurality of brushes operatively associated with said commutator segment, means connecting said brushes and said D.C. load in circuit with said A.C. source for applying rectified A.C. energy to said D.C. load by the cyclic contact of said commutator segment with said brushes, and means for selectively varying the rectified output to said D.C. load in a stepless manner by selectively varying the operating position of at least one of said brushes relative to said commutator segment, said brushes being positioned in parallel alignment to provide maximum D.C. energy output to said load, and being positioned in spaced apart relationship for minimum common contact with said commutator segment to provide minimum D.C. energy output to said load.

5. The improvement of apparatus for converting A.C. energy into D.C. energy having a selectively variable output comprising a source of A.C. energy, a plurality of arcuate commutator segments, synchronous motor driving means locked in phase at synchronous speed at only one cyclic position thereof, said driving means being coupled to said commutator segments and adapted to be energized by said A.C. source for rotating said commutator segments at synchronous speed, a D.C. load, a plurality of brushes operatively associated with said commutator segments, means connecting said brushes and said D.C. load in circuit with said A.C. source for applying rectified A.C. energy to said D.C. load by the cyclic contact of said commutator segment with said brushes, certain ones of said segments and brushes, serving to rectify A.C. energy of a different polarity, and means for selectively varying the rectified output to said D.C. load by selectively varying the operating position of at least one of said brushes relative to its associated commutator segment.

6. The improvement of apparatus for controlling the speed of a D.C. motor operating from an A.C. source comprising a source of A.C. energy, first and second arcuate commutator segments, synchronous motor driving means locked in phase at synchronous speed at only one cyclic position thereof, said driving means being coupled to said first and second commutator segments and adapted to be energized by said A.C. source for rotating said commutator segments at synchronous speed, a D.C. motor, a pair of brushes operatively associated with said commutator segments, means connecting said brushes and said D.C. motor in circuit with said A.C. source for applying rectified A.C. energy to said D.C. motor by the cyclic contact of said first commutator segment with said brushes, one of said brushes being fixed in position with respect to said commutator segments and adapted to contact both said first and second segments, the other one of said brushes being selectively movable with respect to said commutator segments and adapted to contact only said first segment, and brush positioning means for selectively varying the rectified output to said D.C. motor to thereby vary its speed by selectively varying the operating position of at least one of said brushes relative to said first commutator segment.

7. Apparatus in accordance with claim 6 further comprising selectively actuatable means for generating a speed command signal, and control servo means connected to said selectively actuatable means and to said second commutator segment for energizing said brush positioning means to maintain the speed of the D.C. motor at a desired value.

8. The improvement of a variable output rectifier system comprising a source of A.C. energy, an arcuate commutator segment, a synchronous motor locked in phase at synchronous speed at only one cyclic position thereof, said motor being coupled to said commutator segment and adapted to be energized by said A.C. source for rotating said segment at synchronous speed, a D.C. load, a plurality of brushes operatively associated with said commutator segment, means connecting said commutator segment, said brushes and said D.C. load in circuit with said A.C. source for applying rectified A.C. energy to said load by the cyclic contact of said commutator segment with said brushes, brush positioning means for varying the operating position of one of said brushes with respect to said commutator segment to vary the rectified A.C. output to said load, selectively operable control means for generating command signals representative of a desired rectified A.C. output, means for generating feedback signals representative of the rectified A.C. output, and servo control means responsive to said command signals and said feedback signals for controlling the operation of said brush positioning means to cause repositioning of the movable brush to correct for any variations from the desired rectified A.C. output.

9. The improvement of a variable output rectifier system comprising a source of A.C. energy, an arcuate commutator segment, a synchronous motor locked in phase at synchronous speed at only one cyclic position thereof, said motor being coupled to said commutator segment and adapted to be energized by said A.C. source for rotating said segment at synchronous speed, a D.C. load, a plurality of brushes operatively associated with said commutator segment, means connecting said commutator segment, said brushes and said D.C. load in circuit with said A.C. source for applying rectified A.C. energy to said load by the cyclic contact of said commutator segment with said brushes, brush positioning means for varying the operating position of one of said brushes with respect to said commutator segment for varying the rectified A.C. output to said load, selectively operable control means including a square wave generator and a potentiometer connected thereto for generating command signals representative of a desired rectified A.C. output, means for generating feedback signals representative of the rectified A.C. output, and servo control means including transformer means for providing an error signal from said comand signals and said feedback signals for controlling the operation of said brush positioning means to cause repositioning of the movable brush to correct for any errors in the rectified A.C. output with respect to the desired output.

10. The improvement of a speed control system for a D.C. motor operated from an A.C. source comprising a source of A.C. energy, a plurality of arcuate commutator segments, a synchronous motor locked in phase at synchronous speed at only one cyclic position thereof, said motor being coupled to said commutator segments, and adapted to be energized by said A.C. source for rotating said segments at synchronous speed, a D.C. motor, a plurality of brushes operatively associated with said commutator segments, means connecting said commutator segments, said brushes and said D.C. motor in circuit with said A.C. source for applying rectified A.C. energy to said motor by the cyclic contact of said commutator segments with said brushes, brush positioning means for varying the operating position of one of said brushes with respect to said commutator segments for varying the rectified A.C. output of said motor, selectively operable control means for generating command signals representative of a desired speed, means for generating feedback signals representative of the motor speed and servo control means responsive to said command signals and said feedback signals for controlling the operation of said brush positioning means to cause repositioning of the movable brush to correct for any variations from the desired motor speed.

11. A speed control for a D.C. motor in accordance with claim 10 wherein said means for generating feedback signals representative of the motor speed comprises means for obtaining feedback signals derived from the counter-E.M.F. of the D.C. motor load, and further comprising rectifier means connected in series with said D.C. motor load to prevent a short circuit whenever the motor counter E.M.F. exceeds the rectified A.C. applied to the motor.

12. The improvement of a variable output rectifier system comprising a source of A.C. energy, a synchronous motor connected for energization by said A.C. source and being locked in phase at synchronous speed at only one cyclic position thereof, a plurality of commutator segments coupled to said synchronous motor and adapted to be rotated thereby at synchronous speed, a plurality of brushes operatively associated with said commutator segments, a D.C. load, means connecting said brushes, said commutator segments and said D.C. load in circuit with said A.C. source to apply recified A.C. energy to said load, certain ones of said segments and brushes connected to rectify A.C. energy of one polarity, and other ones of said segments and brushes being connected to rectify A.C. energy of a different polarity, conductor means connected to still another one of said segments for obtaining feedback signals representative of the rectified A.C. output, and servo control means connected to said conductor means and a source of command signals for selectively varying the position of one of said brushes relative to is associated commutator segment to maintain a desired rectified A.C. output in accordance with the command signal.

13. The improvement of a variable output rectifier system comprising a source of polyphase A.C. energy, a synchronous motor connected for energization by said A.C. source and being locked in phase at synchronous speed at only one cyclic position thereof, a plurality of electrically conductive commutator segments arranged in groups coupled to said synchronous motor and adapted to be rotated thereby at synchronous speed, conductor means operatively associated with each one of said commutator segments, a brush operatively associated with a commutator segment in each group, a D.C. load, means connecting the brushes, the commutator segments, said conductor means and the D.C. load in circuit with said A.C. source to apply rectified A.C. energy to said load and means for selectively varying the position of said brushes relative to their associated commutator segments to vary the rectified A.C. output as desired.

14. The improvement of a variable output rectifier system comprising a source of A.C. energy, a synchronous motor connected for energization by said A.C. source and being locked in phase at synchronous speed at only one cyclic position thereof, a plurality of commutator segments arranged in groups coupled to said synchronous motor and adapted to be rotated thereby at synchronous speed, a plurality of brushes operatively associated with each group of commutator segments, a D.C. load, means connecting said brushes, said commutator segments and said D.C. load in circuit with A.C. source to apply rectified A.C. energy to said load, one group of said segments and their associated brushes being connected to rectify A.C. energy of one polarity, and the other group of said segments and their associated brushes being connected to rectify A.C. energy of a different polarity, conductor means connected to a commutator segment in one group for obtaining feedback signals representative of the rectified A.C. output, and servo control means connected to said conductor means and a source of command signals for selectively varying the position of one of said brushes relative to its associated commutator segment to maintain a desired rectified A.C. output in accordance with the command signal.

15. A variable output rectifier system in accordance with claim 14 wherein said servo control means comprises a modulator for comparing the command signals with the feedback signals to provide an output control signal, amplifier means for amplifying said output control signal, servo motor means connected to said amplifier means and operated in response to said output control signal, and an operating link coupled to the output shaft of said servo motor means and the movable brush for varying the position of the brush in accordance with the control signal.

16. The improvement of speed control means for a D.C. motor operated from an A.C. source comprising a source of A.C. energy, a synchronous motor connected for energization by said A.C. source and being locked in phase at synchronous speed at only one cyclic position thereof, a plurality of commutator segments coupled to said synchronous motor and adapted to be rotated thereby at synchronous speed, a plurality of brushes operatively associated with said commutator segments, a D.C. motor, means connecting said brushes, said commutator segments and said D.C. motor in circuit with said A.C. source to apply rectified A.C. energy to said motor, certain ones of said segments and brushes being connected to rectify A.C. energy of one polarity, and other ones of said segments and brushes being connected to rectify A.C. energy of a different polarity, a slip ring connected to still another one of said segments for obtaining feedback signals representative of the motor speed, and servo control means connected to said slip ring and a source of command signals for selectively varying the position of one of said brushes relative to its associated commutator segment to maintain a desired motor speed in accordance with the command signal.

17. Apparatus for converting A.C. energy to D.C. energy comprising the improvement of means for selectively varying said D.C. energy output including a source of A.C. energy, a commutator segment, a synchronous motor adapted to lock in phase at synchronous speed at only a single cyclic position connected so as to be energized by said A.C. source for rotating said segment at a synchronous speed, a pair of brushes connected in circuit with said A.C. source and operatively associated with said segment for rectifying said A.C. energy to D.C. energy, and means for selectively varying the operating position of one of said brushes relative to the other brush and said segment to thereby selectively vary said D.C. output as desired.

18. Apparatus for converting A.C. energy to D.C. energy comprising the improvement of means for selectively varying said D.C. energy output including a source of A.C. energy, a commutator segment, a synchronous motor energized by said A.C. source for rotating said segment at a synchronous speed and being locked in phase at synchronous speed at only one cyclic position thereof, a pair of brushes including a movable brush and a fixed brush connected in circuit with said A.C. source and operatively associated with said segment for rectifying said A.C. energy to D.C. energy, and servo control means for selectively varying the operating position of said movable brush relative to the fixed brush and said segment to thereby selectively vary said D.C. output as desired, said servo control means including means for generating a command signal representative of a desired D.C. energy output, feedback means for supplying a signal representative of the D.C. energy output for comparison with said command signal, and servo motor means responsive to the comparison for adjusting the position of the movable brush.

19. Apparatus for converting A.C. energy to D.C. energy comprising the improvement of means for selectively varying the output of said D.C. energy including a source of A.C. energy, a synchronously rotating commutator segment, a synchronous motor of the type which locks in phase at synchronous speed at only one cyclic position connected to said source of A.C. energy and adapted to be energized thereby for rotating said segment, a pair of brushes connected in circuit with said A.C. source and operatively associated with said synchronously rotating segment for rectifying said A.C. energy to D.C. energy, and means for selectively varying the operating position of one of said brushes relative to the other brush and said segment to thereby selectively vary said D.C. output as desired.

20. The improvement of a variable output rectifier system comprising a source of polyphase A.C. energy, a plurality of related groups arcuate commutator segments, each group comprising a plurality of said segments, a synchronous motor coupled to said groups of commutator segments and adapted to be energized by one or more phase outputs of said A.C. source for rotating said groups of segments at synchronous speed, a D.C. load, said synchronous motor being locked in phase at synchronous speed at only a single cyclic position thereof, a plurality of brushes operatively associated with said groups of commutator segments, means connecting said commutator segments, said brushes and said D.C. load in circuit with said A.C. source for applying rectified A.C. energy to said load by the cyclic contact of said commutator segments with said brushes, and brush positioning means for varying the operating position of one of said brushes with respect to one of said groups of commutator segments to vary the rectified A.C. output to said D.C. load.

21. A variable output rectifier system in accordance with claim 20 wherein said D.C. load is inductive and further comprising rectifier means connected between said D.C. load and one of said brushes to prevent short circuits from occurring when the counter-E.M.F. of the inductive load is greater than the voltage applied to said load.

22. A variable output rectifier system comprising a three phase source of electrical energy, a plurality of groups of arcuate commutator segments, each group containing three of said segments, conductor means connecting a segment in each group to a conductor of said three phase source, a synchronous motor energized by said source of electrical energy and coupled to said groups of arcuate commutator segments, for rotating said segments at synchronous speed, said synchronous motor being locked in phase at synchronous speed at only a single cyclic position thereof, a D.C. load, a plurality of brushes connecting said D.C. load and said commutator segments in circuit with said three phase source for applying rectified A.C. energy to said load in response to the cyclic contact of said brushes and segments, and adjustable means for varying the operating position of at least one of said brushes relative to said commutator segments, to thereby vary the rectified output to said load.

References Cited in the file of this patent

UNITED STATES PATENTS

| | | |
|---|---|---|
| 552,260 | Pollak | Dec. 31, 1895 |
| 2,765,434 | Dudenhausen | Oct. 2, 1956 |